United States Patent
Lee et al.

(10) Patent No.: US 9,894,133 B2
(45) Date of Patent: Feb. 13, 2018

(54) METHOD AND APPARATUS FOR CONTROLLING TRAFFIC IN WIRELESS COMMUNICATION SYSTEM

(71) Applicant: Samsung Electronics Co., Ltd., Gyeonggi-do (KR)

(72) Inventors: Ji-Cheol Lee, Gyeonggi-do (KR); Hyung-Ho Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 962 days.

(21) Appl. No.: 14/201,639

(22) Filed: Mar. 7, 2014

(65) Prior Publication Data

US 2014/0258456 A1 Sep. 11, 2014

(30) Foreign Application Priority Data

Mar. 7, 2013 (KR) .................. 10-2013-0024306

(51) Int. Cl.
*G06F 15/16* (2006.01)
*H04L 29/08* (2006.01)
(Continued)

(52) U.S. Cl.
CPC .......... *H04L 67/02* (2013.01); *H04L 65/1073* (2013.01); *H04L 65/4084* (2013.01);
(Continued)

(58) Field of Classification Search
CPC ........ H04W 76/02; H04L 67/02; H04L 69/22; H04L 65/1073; H04L 65/4084
(Continued)

(56) References Cited

U.S. PATENT DOCUMENTS 6,587,466 B1 * 7/2003 Bhattacharya ...... H04L 41/0893
370/395.21
8,442,522 B2 * 5/2013 Pancorbo Marcos ... H04L 12/14
455/406
(Continued)

FOREIGN PATENT DOCUMENTS

KR 10-2010-0105569 9/2010
WO 2011109821 A2 9/2011
(Continued)

OTHER PUBLICATIONS

International Search Report dated Jun. 17, 2014 in connection with International Patent Application No. PCT/KR2014/001904, 3 pages.
(Continued)

*Primary Examiner* — El Hadji Sall

(57) ABSTRACT

Provided is a method for identifying and controlling traffic in a wireless communication system. The method includes receiving, by a gateway, a rule corresponding to a determined policy and packet filter information from a policy server upon receiving an Internet Protocol (IP) session establishment request from a User Equipment (UE); installing a packet filter according to the received packet filter information; and after a Transmission Control Protocol (TCP) session is established between the UE and a content server, identifying traffic using the packet filter and transmitting the identified traffic to a Radio Access Network (RAN) to schedule packet responsive to a Hyper Text Transfer Protocol (HTTP) request being from the UE after a Transmission Control Protocol (TCP) session is established between the UE and a content server.

22 Claims, 7 Drawing Sheets

(51) Int. Cl.
  *H04L 29/06* (2006.01)
  *H04L 12/801* (2013.01)
  *H04W 76/02* (2009.01)
(52) U.S. Cl.
  CPC .............. *H04L 69/22* (2013.01); *H04L 47/14* (2013.01); *H04L 67/325* (2013.01); *H04W 76/022* (2013.01)
(58) Field of Classification Search
  USPC ................................. 709/217, 227, 200, 224
  See application file for complete search history.

(56) References Cited

U.S. PATENT DOCUMENTS

| | | | | |
|---|---|---|---|---|
| 8,516,073 | B2* | 8/2013 | Hu | H04L 12/14 709/217 |
| 8,700,040 | B2* | 4/2014 | Pancorbo Marcos | H04W 76/041 370/331 |
| 8,706,080 | B2* | 4/2014 | Yang | H04L 12/14 370/252 |
| 8,755,352 | B2* | 6/2014 | Rommer | H04W 36/0011 370/331 |
| 2005/0152270 | A1* | 7/2005 | Gomez Paredes | H04L 41/0893 370/229 |
| 2007/0280105 | A1* | 12/2007 | Barkay | H04L 47/10 370/229 |
| 2008/0212583 | A1* | 9/2008 | Rey | H04L 12/1836 370/390 |
| 2008/0220775 | A1* | 9/2008 | Tischer | H04L 12/66 455/435.1 |
| 2008/0304416 | A1* | 12/2008 | Fodor | H04L 47/10 370/237 |
| 2009/0116458 | A1* | 5/2009 | Ramesh | H04L 65/605 370/336 |
| 2010/0211666 | A1* | 8/2010 | Kvernvik | H04L 41/0681 709/223 |
| 2010/0291923 | A1* | 11/2010 | Zhou | H04L 12/1403 455/432.1 |
| 2011/0075675 | A1* | 3/2011 | Koodli | H04L 12/14 370/401 |
| 2011/0131313 | A1* | 6/2011 | Zhou | H04Q 3/0045 709/223 |
| 2011/0158090 | A1* | 6/2011 | Riley | H04L 12/14 370/230 |
| 2011/0219426 | A1* | 9/2011 | Kim | H04L 41/5058 726/1 |
| 2012/0021741 | A1* | 1/2012 | Pancorbo Marcos | H04L 12/14 455/433 |
| 2012/0102174 | A1* | 4/2012 | Zhou | H04L 12/14 709/223 |
| 2012/0110193 | A1* | 5/2012 | Zhou | H04M 15/66 709/227 |
| 2012/0202457 | A1* | 8/2012 | Yang | H04L 12/5695 455/406 |
| 2012/0239816 | A1* | 9/2012 | Carnero Ros | H04M 15/66 709/227 |
| 2012/0246325 | A1* | 9/2012 | Pancorbo Marcos | H04L 12/2602 709/227 |
| 2012/0281566 | A1* | 11/2012 | Pelletier | H04W 76/046 370/252 |
| 2012/0314632 | A1* | 12/2012 | Martinez De La Cruz | H04L 65/1046 370/310 |
| 2012/0320801 | A1* | 12/2012 | Yang | H04L 12/14 370/259 |
| 2013/0021916 | A1* | 1/2013 | Zhou | H04W 28/0284 370/241 |
| 2013/0094471 | A1* | 4/2013 | Zhao | H04W 36/0011 370/331 |
| 2013/0097305 | A1* | 4/2013 | Albal | H04W 76/00 709/224 |
| 2013/0316673 | A1* | 11/2013 | Goldner | H04L 12/1407 455/406 |
| 2014/0086052 | A1* | 3/2014 | Cai | H04L 47/748 370/235 |
| 2014/0155043 | A1* | 6/2014 | Gell | H04W 4/003 455/414.1 |
| 2014/0233384 | A1* | 8/2014 | Howard | H04W 28/0289 370/235 |
| 2014/0317269 | A1* | 10/2014 | Munoz de la Torre Alonso | H04L 47/20 709/224 |
| 2015/0264706 | A1* | 9/2015 | Voigt | H04W 72/1263 370/329 |

FOREIGN PATENT DOCUMENTS

| | | |
|---|---|---|
| WO | 2012063106 A1 | 5/2012 |
| WO | WO 2012/178117 A2 | 12/2012 |

OTHER PUBLICATIONS

Written Opinion of the International Searching Authority dated Jun. 17, 2014 in connection with International Patent Application No. PCT/KR2014/001904, 5 pages.
Extended European Search Report dated Oct. 18, 2016 in connection with European Application No. 14760640.4, 8 pages.
3GPP TS 29.212 V11.6.0, "3rd Generation Partnership Project; Technical Specification Group Core Network and Terminals; Policy and Charging Control (PCC); Reference points", (Release 11), Sep. 21, 2012, 194 pages.

* cited by examiner

| Octets | Bits | | | | | | | |
|---|---|---|---|---|---|---|---|---|
| | 8 | 7 | 6 | 5 | 4 | 3 | 2 | 1 |
| 1 | 0x01 ||||||||
| 2 | Service Class Indicator ||||||||
| 3 | Scheduling Policy Index ||||||||
| 4 | Next Extension Header (412) ||||||||

METHOD AND APPARATUS FOR CONTROLLING TRAFFIC IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Mar. 7, 2013 and assigned Serial No. 10-2013-0024306, the entire disclosure of which is incorporated herein by reference.

TECHNICAL FIELD

The present disclosure relates generally to a method and apparatus for controlling traffic in a wireless communication system, and more particularly, to a method and apparatus for efficiently scheduling video packets.

BACKGROUND

An Evolved Packet Core (EPC) has been defined as an Internet Protocol (IP)-based core network in $3^{rd}$ Generation Partnership Project (3GPP) Release 8. In the EPC, Traffic Detection Function (TDF) or Policy and Charging Enforcement Function with Application Detection Control (PCEF with ADC) have been standardized, which is equipment for controlling the subscriber policy for each application individually. The TDF or a Packet Data Network (PDN) Gateway (P-GW) (or PCEF with ADC) may detect application traffic, and transmit the detected traffic information to a policy server or Policy Control and Charging Rules Function (PCRF), and the PCRF may provide the subscriber policy for the detected traffic to the TDF or the P-GW, allowing the TDF or the P-GW to perform a traffic control function (e.g., gating, shaping, redirection, and the like) for the traffic detected for each application.

However, since specific ways to perform Hyper Text Transfer Protocol (HTTP) detection is not defined in the conventional EPC standard, the operator needs to depend on implementation of the TDF equipment in order to create rules for an HTTP-based protocol which is not supported by the conventional TDF. At present, most of the traffic is transmitted through the default bearer, and even though a Radio Access Network (RAN) intends to apply the differentiated scheduling scheme for transmission of video traffic, the RAN may not divide IP flows which are transmitted through the same bearer, and may need a signaling procedure for creating a separate bearer in order to apply the differentiated scheduling scheme for IP flows. In addition, in the structure where TDF and P-GW are separated, an index for separate RAN scheduling or additional scheduling information may not be transmitted to the RAN, for an IP flow separated through an application detection function. A way to use Differentiated Service Code Point (DSCP) has been discussed to solve this problem, but the use of DSCP may decrease the number of bits that can be processed, and make it impossible to transmit additional parameters.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for defining and installing operator-based detection rules for Hyper Text Transfer Protocol (HTTP)-based video transfer services.

Another aspect of the present disclosure is to provide a method and apparatus for transmitting extracted scheduling parameters to a Radio Access Network (RAN) after detecting HTTP-based video transfer traffic.

Another aspect of the present disclosure is to provide a method and apparatus for transmitting scheduling parameters extracted in Traffic Detection Function (TDF) to a RAN through a Packet Data Network (PDN) Gateway (P-GW) if the P-GW and the TDF are separated.

In accordance with an aspect of the present disclosure, there is provided a method for identifying and controlling traffic in a wireless communication system. The method includes receiving, by a gateway, a rule corresponding to a determined policy and packet filter information from a policy server upon receiving an Internet Protocol (IP) session establishment request from a User Equipment (UE); installing a packet filter according to the received packet filter information; and after a Transmission Control Protocol (TCP) session is established between the UE and a content server, identifying traffic using the packet filter and transmitting the identified traffic to a Radio Access Network (RAN) to schedule packet responsive to a Hyper Text Transfer Protocol (HTTP) request being from the UE after a Transmission Control Protocol (TCP) session is established between the UE and a content server.

In accordance with another aspect of the present disclosure, there is provided a gateway apparatus for identifying and controlling traffic in a wireless communication system. The gateway apparatus includes a transceiver configured to receive a rule corresponding to a determined policy and packet filter information from a policy server upon receiving an Internet Protocol (IP) session establishment request from a User Equipment (UE); and a controller configured to install a packet filter according to the received packet filter information, and identify traffic using the packet filter if there is a Hyper Text Transfer Protocol (HTTP) request from the UE after a Transmission Control Protocol (TCP) session is established between the UE and a content server.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a scheduling policy index and its parameters according to an embodiment of the present disclosure;

Throughout the drawings, like reference numerals will be understood to refer to like parts, components, and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of example embodiments of the disclosure as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure may provide a method in which a gateway extracts scheduling profile and parameters for efficiently transmitting video traffic in a Radio Access Network (RAN) by using a Hyper Text Transfer Protocol (HTTP) packet filter and transmitting the extracted parameters to the RAN when servicing video streaming through an HTTP protocol in a wireless communication network.

Figure 1:
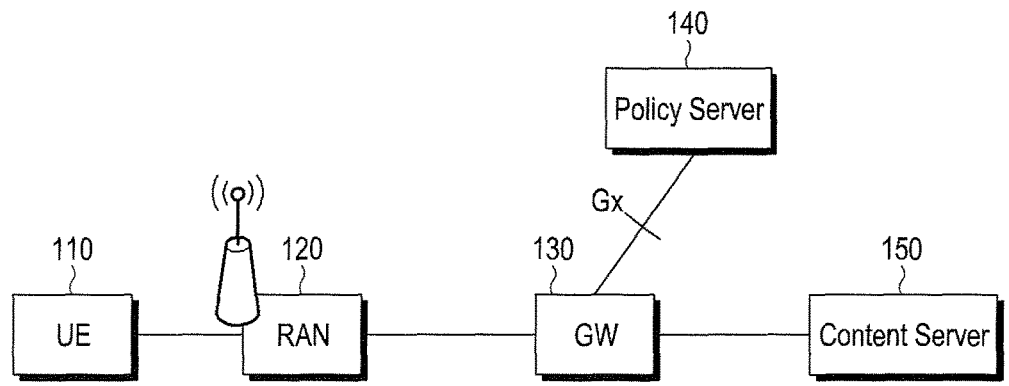
FIG. 1 illustrates a configuration of a wireless communication system performing scheduling according to an embodiment of the present disclosure.

FIG. 1 illustrates a configuration of a wireless communication system performing scheduling according to an embodiment of the present disclosure. Although an embodiment of the present disclosure will be described herein below with reference to a 3$^{rd}$ Generation Partnership Project (3GPP) Evolved Packet Core (EPC) by way of example, it should be noted that the scheduling method proposed in the present disclosure is not limited to the 3GPP EPC.k.

Referring to FIG. 1, a User Equipment (UE) 110 may receive video traffic from a content server 150 according to the scheduling by a RAN 120. The RAN 120 may represent, for example, an evolved Node B (eNB) or a Radio Network Control (RNC). In a 3GPP Policy and Charging Control (PCC) structure, a policy server 140 is the same as a Policy Control and Charging Rules Function (PCRF), and may control policies related to charging. The policy server 140 may establish, in a gateway, an HTTP packet filter and a RAN scheduling policy in a gateway in an Internet Protocol (IP) session creation (or IP-CAN Session Establishment) process for a UE. In a 3GPP structure, a gateway (GW) 130 may be the same as a Packet Data Network (PDN) Gateway (P-GW) having Application Detection Control (ADC) rules or a P-GW including TDF. The GW 130 may be connected to the policy server 140 through a reference point Gx, and may detect a Transmission Control Protocol (TCP) session, create 5-tuple-based packet content, and determine whether headers of an HTTP Request message and an HTTP Response message match with an HTTP packet filter. The GW 130 may set a relevant index by applying the scheduling policy of the RAN 120 to a TCP session coinciding with an installed HTTP packet filter, extract parameters additionally needed in the RAN 120 from HTTP header information, create GPRS Tunneling Protocol (GTP) extension, and transmit the created GTP extension to the RAN 120. The RAN 120 may distinguish between parameters for a general packet and parameters for a video packet by GTP extension, and then perform scheduling appropriate thereto.

Next, reference will be made to FIG. 2 to describe a process of installing an HTTP packet filter according to an embodiment of the present disclosure.

Figure 2:
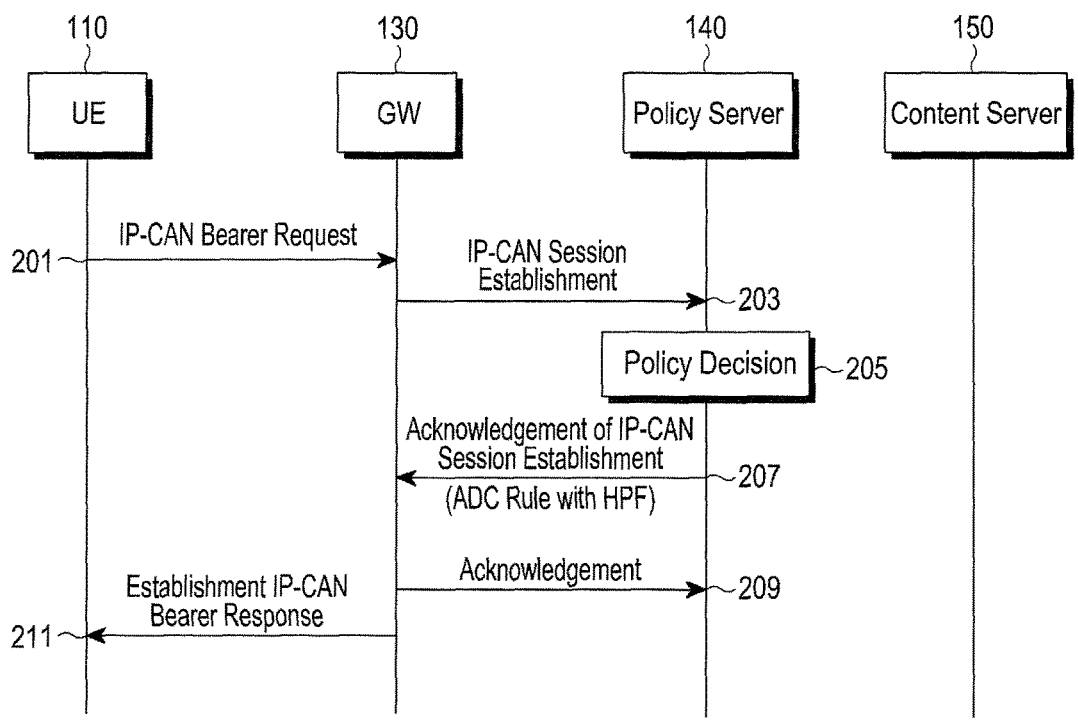
FIG. 2 illustrates a process of installing an HTTP packet filter according to an embodiment of the present disclosure.

Referring to FIG. 2, the UE 110 may send an IP Connectivity Access Network (IP-CAN) Bearer Request message to the GW 130 in operation 201, and upon receiving the IP-CAN Bearer Request message, the GW 130 may send an IP-CAN Session Establishment message to the policy server 140 in operation 203. The policy server 140 may determine the policy in operation 205, and establish an ADC rule corresponding to subscriber information using an 'Acknowledgement of IP-CAN Session Establishment' message in operation 207. The policy server 140 may install HTTP packet filter (HPF) information together. Upon receiving the 'Acknowledgement of IP-CAN Session Establishment' message, the GW 130 may send an Acknowledgement message to the policy server 140 in operation 209, and send an 'Establishment IP-CAN Bearer Response' message to the UE 110 in operation 211.

The HTTP packet filter information that the policy server 140 transmits to the GW 130 in operation 207 is defined in Table 1 below.

TABLE 1

| AVP name | Description | Example |
| --- | --- | --- |
| HTTP Packet Filter | This AVP represents the match condition for the HTTP Request and HTTP Response. The device (for example the PCEF with ADC or TDF) installing this filter, After parsing the HTTP request and response, the device (for example, the PCEF with ADC or PCEF) compares the HTTP request and the HTTP response with the received HTTP Packet Filter and determines the appropriate action specified with the rule. One example action can map the appropriate bearer and its scheduling parameter index | http.request.uri = ~/*.youtube.com/ AND http request.uri.param = ~/*videoplayback*/ http.response.content-type == "video/mp4" http.response.statuscode == "200 OK" |
| RAN Scheduling Info | This AVP represents the RAN scheduling policy index and its extracted parameters for example, chunk date size, maximum delay for transmission. | Scheduling Policy Index = 1 (Chunk data size, max delay) = (300 kB, 500 ms) |

Figure 3:
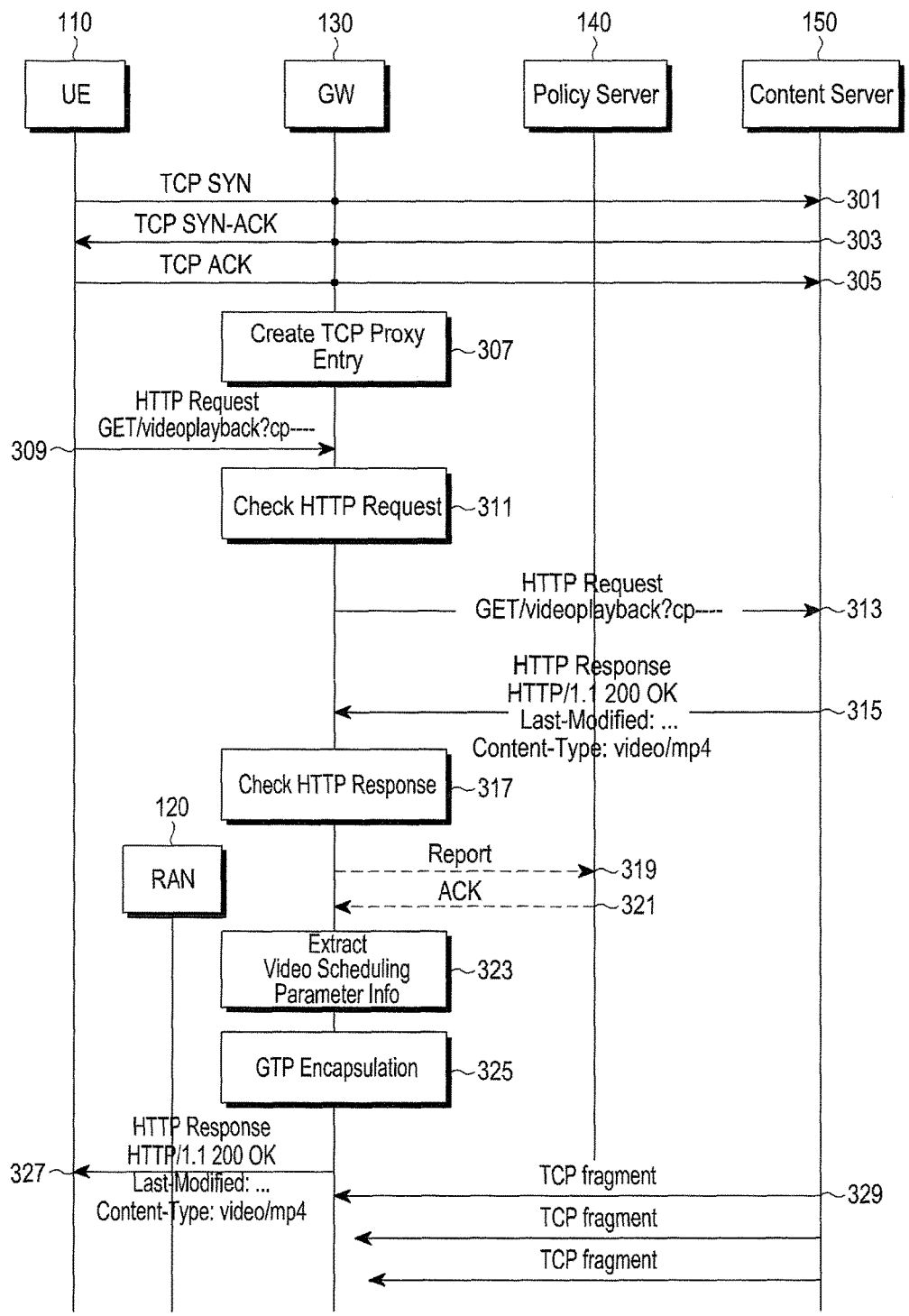
FIG. 3 illustrates a process of extracting and transmitting HTTP packet filtering and RAN scheduling parameters according to an embodiment of the present disclosure.

FIG. 3 illustrates a process of extracting and transmitting HTTP packet filtering and RAN scheduling parameters according to an embodiment of the present disclosure.

Referring to FIG. 3, a procedure for creating a TCP session for transmission of video packets may be performed through the GW 130 between the UE 110 and the content server 150 in operations 301 to 305. In operation 307, the GW 130 may create a TCP proxy for a newly created TCP session, and register a new entry for the TCP session using 5-tuple information of the TCP session between the UE 110 and the content server 150. Upon receiving an HTTP Request message from the UE 110 in operation 309, the GW 130, in operation 311, may check an installed HTTP packet filter and determine whether the checked HTTP packet filter coincides (or matches) with the received HTTP Request message. If it is determined that the HTTP Request message coincides with the HTTP packet filter and there is an HTTP packet filter item for an HTTP Response, the GW 130 may send an HTTP Request to the content server 150 in operation 313 and receive an HTTP Response from the content server 150 in operation 315. Thereafter, in operation 317, the GW 130 may determine whether the HTTP Response message coincides with the HTTP packet filter. If both of the HTTP Request message and the HTTP Response message coincide with the HTTP packet filter, and an ADC rule is formed to make a report to the policy server 140, the GW 130 may report the detected TDF information to the policy sever 140 in operation 319, and then receive an ACK message from the policy server 140 in operation 321.

If it is determined in operation 311 that the HTTP Request message does not coincide with the HTTP packet filter, the GW 130 may proceed to operation 319 without performing operations 313 to 317. If it is determined in operation 317 that the HTTP Response message does not coincide with the HTTP packet filter, the GW 130 may transmit HTTP Response packets to the UE 110 without performing the subsequent operations.

In operation 323, the GW 130 may extract parameters needed for scheduling by analyzing the HTTP Response and content. The parameters needed for scheduling may include, for example, video chunk size, duration, required network bandwidth, deadline and the like. After extracting the parameters needed for scheduling, the GW 130 may transmit the extracted parameters to the RAN 120 using a GTP extension header in operation 325, and the RAN 120 may schedule video packets depending on the received scheduling parameters and transmit the scheduled video packets to the UE 110. In the case of the 3GPP EPC structure, a P-GW may transmit the scheduling parameters to a Severing Gateway (S-GW).

FIG. 4 illustrates a scheduling policy index 401 and its parameters according to an embodiment of the present disclosure. In FIG. 4, the extracted scheduling parameters may be recorded in 'Next Extension Header' 412.

The GW 130 may transmit HTTP Response packets to the UE 110 in operation 327, and receive TCP fragments from the content server 150 in operation 329.

Figure 5:
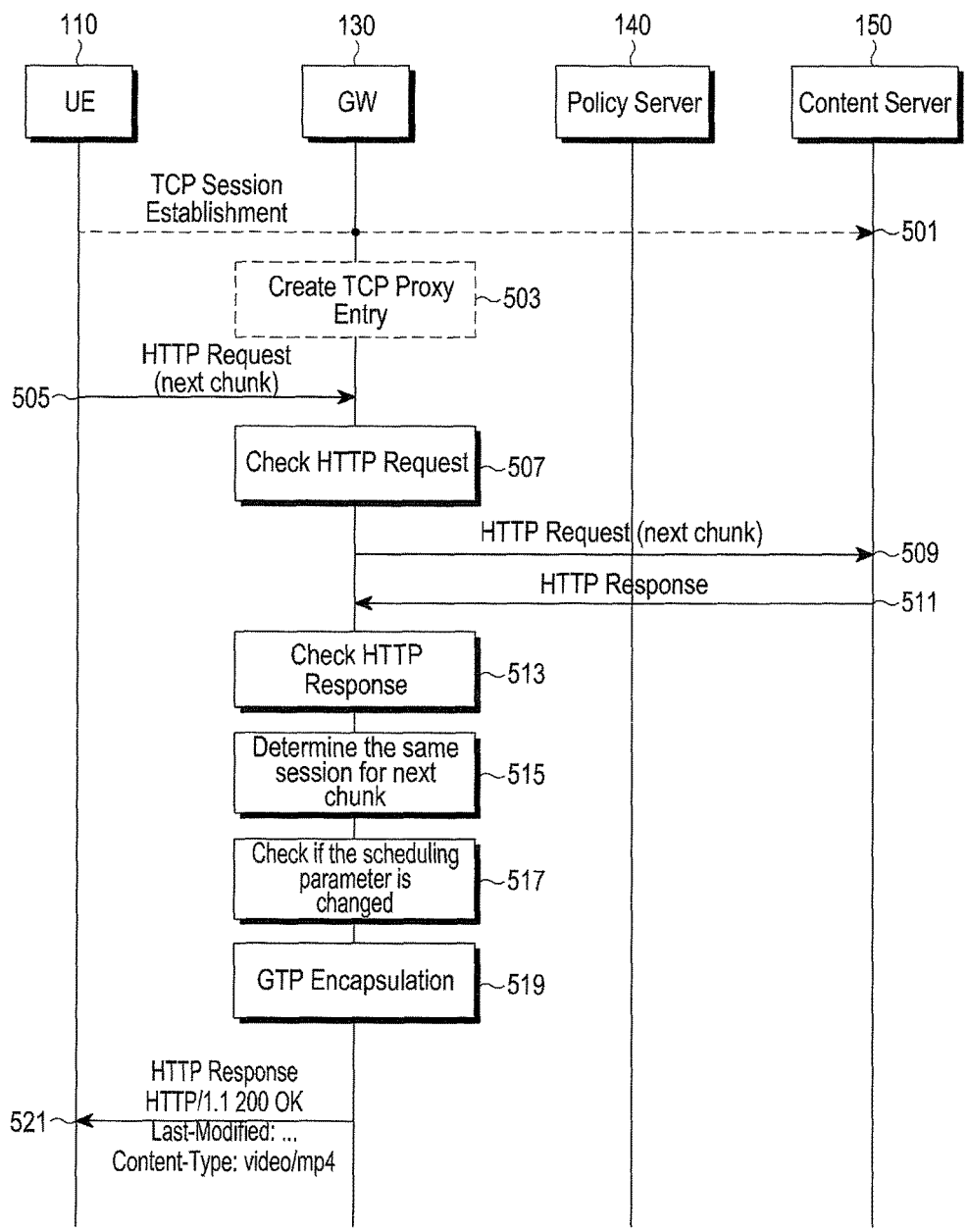
FIG. 5 illustrates a process of extracting and transmitting HTTP packet filtering and RAN scheduling parameters according to another embodiment of the present disclosure.

FIG. 5 illustrates a process of extracting and transmitting HTTP packet filtering and RAN scheduling parameters according to another embodiment of the present disclosure.

Referring to FIG. 5, if a TCP session is newly created between the UE 110 and the content server 150 in operation 501, the GW 130 may newly create a TCP Proxy entry in operation 503. Upon receiving an HTTP Request from the UE 110 in operation 505, the GW 130 may determine in operations 507 to 513 whether the HTTP Request and the HTTP Response coincide with the HTTP packet filter, like in FIG. 3. Thereafter, the GW 130 may determine in operation 515 whether the HTTP Request sent by the UE 110 is a request for the next chunk of the same content as the previously requested content, based on the HTTP Request/ Response and registered session information. If the HTTP Request is a request for the same content, the GW 130 may determine in operation 517 whether the scheduling and related parameters are the same as those for the existing session. If it is determined that the scheduling and related parameters are the same as those for the existing session, the GW 130 may transmit the previously used scheduling parameters to a RAN (not shown) without extracting the scheduling parameters, and send an HTTP Response to the UE 110, in operations 519 and 521. If the HTTP Request sent by the UE 110 is a request for content different from the previously requested content, the GW 130 may operate according to operations 319 to 329 in FIG. 3 in the future.

Figure 6:
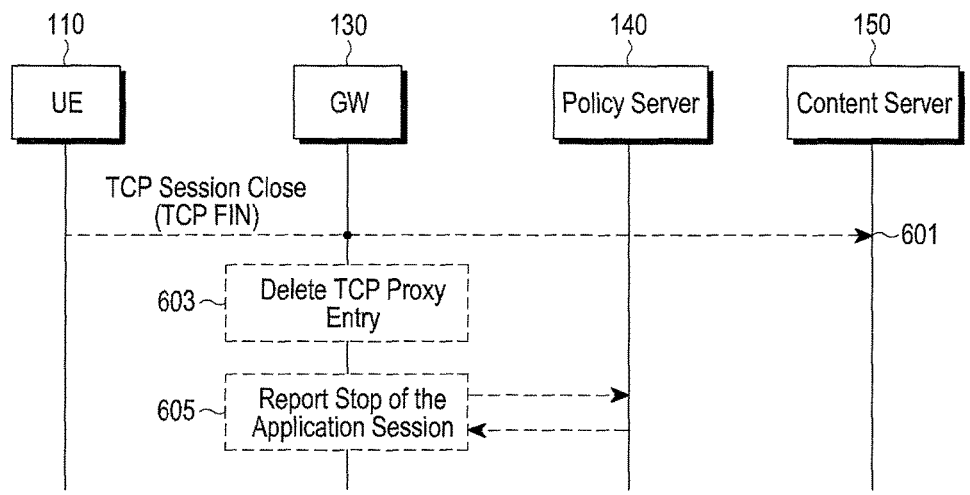
FIG. 6 illustrates a video traffic session release (or teardown) process according to an embodiment of the present disclosure.

FIG. 6 illustrates a video traffic session release (or teardown) process according to an embodiment of the present disclosure.

Referring to FIG. 6, if the UE 110 closes a TCP session to the content server 150 through the GW 130 in operation 601, the GW 130 may delete TCP Proxy Entry in operation 603, and provide information about stop of the detected application session to the policy server 140 in operation 605. The GW 130 may report, to the policy server 140, the information (e.g., time, scheduling policy index, applied packet count and the like) about scheduling which has been performed on the session.

Figure 7:
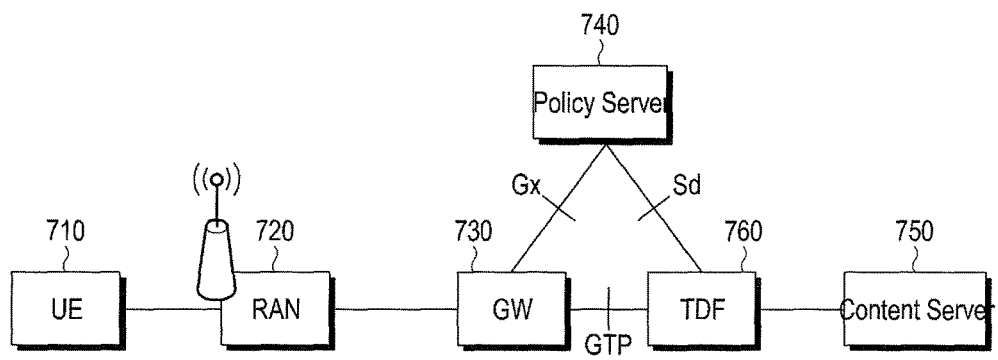
FIG. 7 illustrates a configuration of a wireless communication system performing scheduling according to another embodiment of the present disclosure.

FIG. 7 illustrates a configuration of a wireless communication system performing scheduling according to another embodiment of the present disclosure.

Referring to FIG. 7, a TDF 760 may be implemented as a standalone, e.g., an equipment separate from a GW 730, and connected to a policy server 740 through a reference point Sd. In this structure, the TDF 760 may receive an HTTP packet filter from the policy server 740, and determine whether Request/Response for an HTTP session coincident with the HTTP packet filter, and if there are scheduling parameters associated therewith, the TDF 760 may transmit the scheduling parameters to a RAN 720 through the GW 730. To this end, the TDF 760 may create a TDF GTP session to the GW 730. The GTP session may be created during IP-CAN session creation or during application detection. The TDF 760 may transmit traffic for the detected session through the created TDF GTP session.

Figure 8:
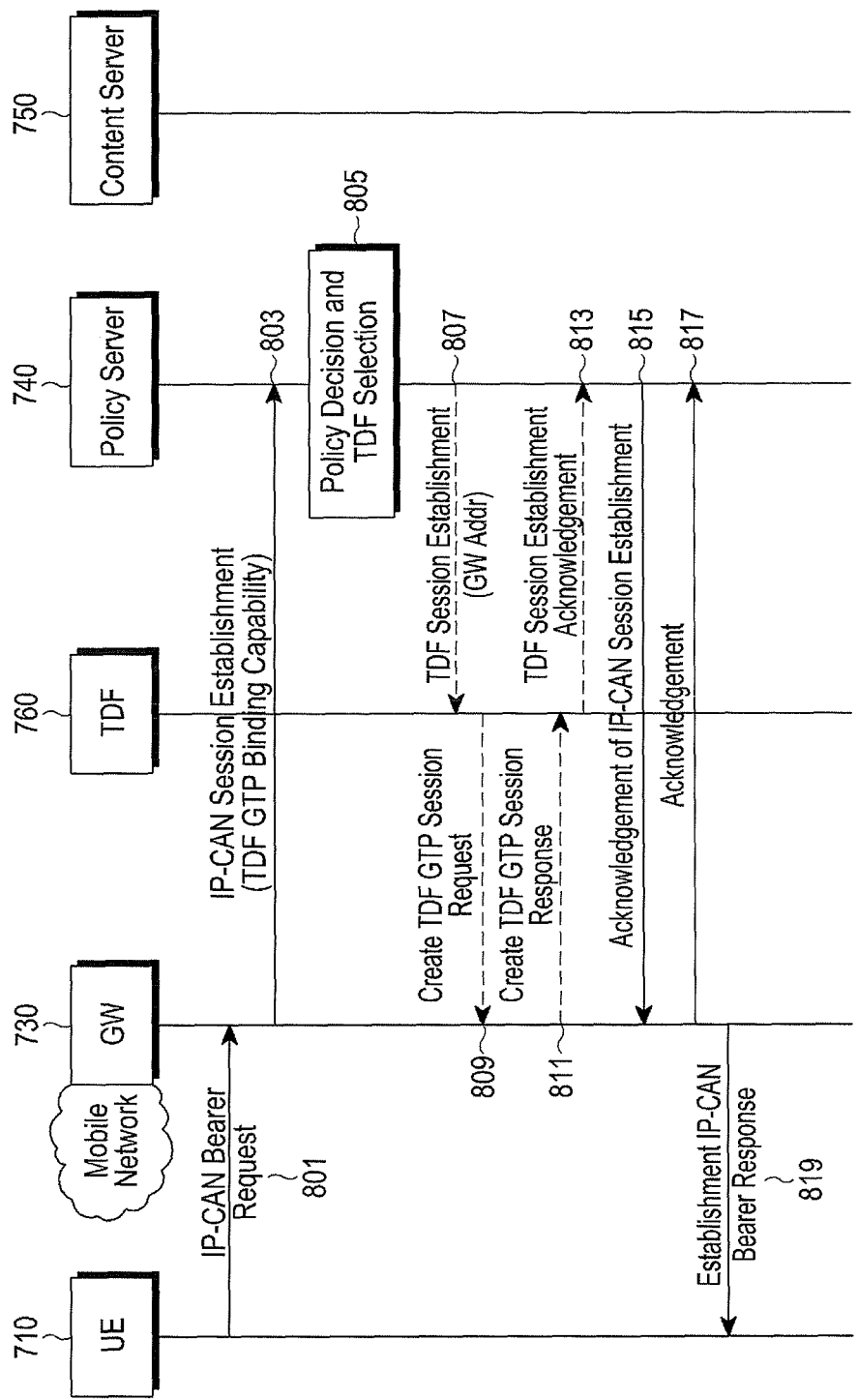
FIG. 8 illustrates a TDF-GTP session creation process during IP-CAN session creation according to an embodiment of the present disclosure.

FIG. 8 illustrates a TDF-GTP session creation process during IP-CAN session creation according to an embodiment of the present disclosure.

Referring to FIG. 8, the UE 710 may perform IP-CAN Session Establishment through the GW 730 in operations 801 and 803. The GW 730 may transmit information indicating availability of TDF GTP binding to the policy server 740. The policy server 740 may determine a policy and select a TDF in operation 805, and send a TDF Session Establishment message to the selected TDF 760 in operation 807. The policy server 740 may transmit an address of the GW 730 together with the TDF Session Establishment message. In operation 809, the TDF 760 may send a Create TDF GTP Session Request to the GW 730, for the created IP-CAN session, thereby creating a TDF GTP session. The TDF 760 may transmit a Tunnel End-point Identifier (TEID) together with the Create TDF GTP Session Request. After successfully creating the TDF GTP session, the GW 730 may and transmit the TEID carried on a response message to the TDF 760 in operation 811. In this manner, a TDF GTP session is completely created between the GW 730 and the TDF 760. The TDF 760 may inform the policy server 740 of the completed creation of the TDF GTP session in operation 813, and the policy server 740 may inform the GW 730 of the completed creation of the IP-CAN session in operation 815 and receive an ACK message in operation 817. The GW 730 may send an IP-CAN Bearer Response message to the UE 710 in operation 819.

If the IP-CAN session is successfully created, the TDF 760 may detect the creation of a session between the UE 710 and a content server 750, and upon receiving a packet coinciding with the scheduling policy associated with this session, the TDF 760 may transmit the packet to the GW 730 through the created TDF GTP session. The GW 730 may receive GTP supplement information received from the TDF 760, and additional scheduling parameters, and transmit them to a RAN (not shown).

Figure 9:
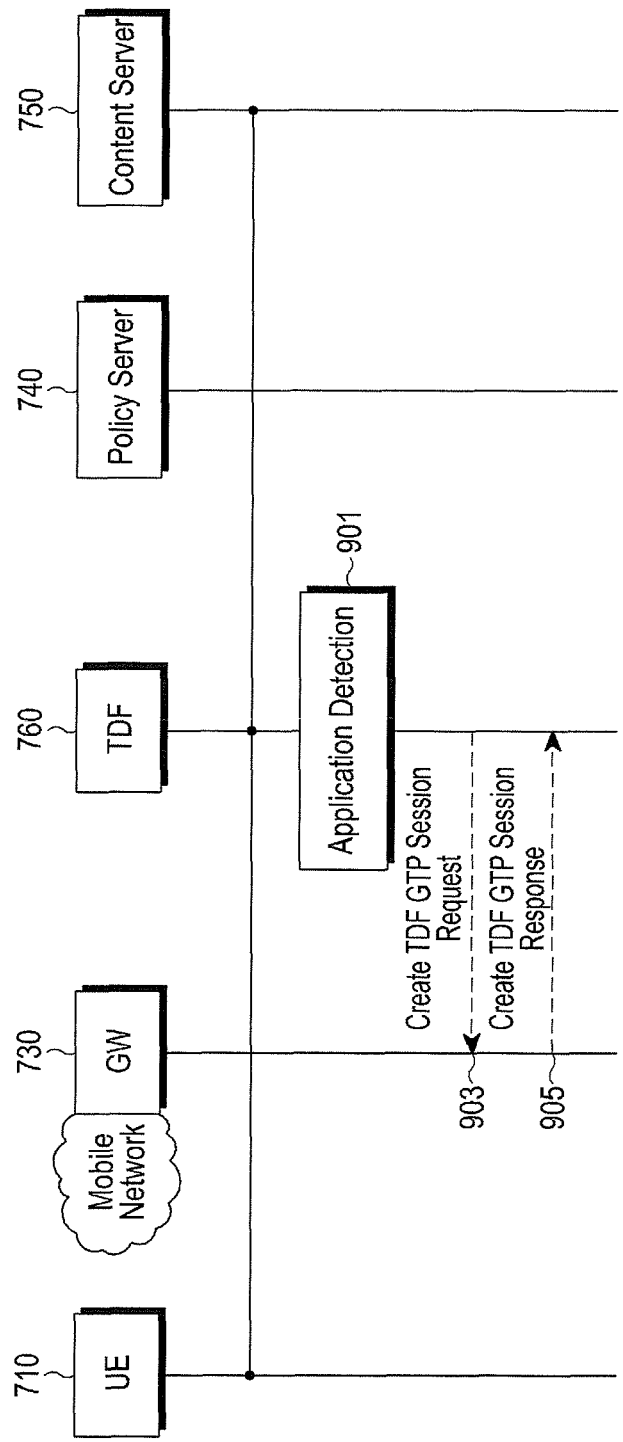
FIG. 9 illustrates a TDF-GTP session creation process during application detection according to an embodiment of the present disclosure.

FIG. 9 illustrates a TDF-GTP session creation process during application detection according to an embodiment of the present disclosure.

Referring to FIG. 9, if the TDF 760 performs application detection in operation 901 after an IP-CAN session is created among the UE 710, the TDF 760 and the content server 750, the TDF 760 may request creation of a TDF GTP session from the GW 730 in operation 903, and receive a response thereto in operation 905, thereby creating the TDF GTP session. Thereafter, the TDF 760 may map the detected traffic to its relevant GTP session and transmit the traffic to the GW 730, and the GW 730 may transmit information related to the RAN (not shown) through a GTP header based on the received GTP information.

Although the internal structure of the gateway has not been described in detail in this specification, the gateway may include a transceiver for transmitting and receiving signals, and a controller for performing actual operations of the gateway.

As is apparent from the foregoing description, according to an embodiment of the present disclosure, a scalable HTTP packet filter may be installed in the gateway by generalizing the HTTP packet filter. In addition, according to an embodiment of the present disclosure, the gateway may detect an HTTP packet stream carrying video traffic, extract a RAN scheduling method and scheduling parameters suitable to the detected HTTP packet stream, and transmit the extracted parameters to the RAN, such that scheduling suitable for video is possible in a RAN. Further, even if the gateway and the TDF are implemented as separate equipment's, the TDF may transmit scheduling parameters for detected video traffic to the RAN via the gateway.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for identifying and controlling traffic in a wireless communication system, the method comprising:
   receiving, by a gateway, a rule corresponding to a policy and packet filter information including match conditions for a hyper text transfer protocol (HTTP) request and an HTTP response, a RAN scheduling policy index, and scheduling parameters from a policy server in response to receiving an internet protocol (JP) session establishment request from a user equipment (UE);
   installing, by the gateway, an HTTP packet filter based on the packet filter information; and
   after a transmission control protocol (TCP) session is established between the UE and a content server, identifying, by the gateway, traffic using the HTTP packet filter and transmitting the identified traffic to a radio access network (RAN) to schedule packet in response to receiving an HTTP request being from the UE.

2. The method of claim 1, wherein transmitting the identified traffic to the RAN comprises:
   comparing the HTTP request received from the UE with the HTTP packet filter and forwarding the HTTP request to the content server;

receiving an HTTP response from the content server, and comparing the received HTTP response with the HTTP packet filter;
identifying, if the HTTP request and the HTTP response match with the HTTP packet filter, a video packet from the HTTP response;
transmitting the identified video packet to the RAN;
extracting scheduling policy and scheduling parameters for scheduling; and
transmitting the extracted scheduling policy and scheduling parameters to the RAN.

3. The method of claim 2, wherein the extracted scheduling policy and scheduling parameters are transmitted to the RAN through a general packet radio service (GPRS) tunneling protocol (GTP) extension header.

4. The method of claim 2, wherein extracting the scheduling parameters further comprises transmitting traffic detection function (TDF) information to the policy server.

5. The method of claim 2, wherein the scheduling parameters include at least one of a scheduling policy index, a bandwidth, a video chunk data size, and a deadline.

6. The method of claim 2, further comprising:
receiving an HTTP request from the UE after a new TCP session is created between the UE and the content server;
comparing the HTTP request received from the UE with the HTTP packet filter;
forwarding the HTTP request to the content server;
receiving an HTTP response from the content server;
comparing the received HTTP response with the HTTP packet filter;
determining, if the HTTP request and the HTTP response match with the HTTP packet filter, whether the HTTP request received from the UE is a request for a next chunk of content which is the same as previously requested content;
determining whether the scheduling parameters are the same, if the HTTP request is the request for the next chunk of the content; and
transmitting the extracted scheduling parameters to the RAN, if the scheduling parameters are the same.

7. The method of claim 1, further comprising:
receiving a session close message from the UE;
forwarding the received session close message to the content server; and
reporting scheduling information for closed session to the policy server.

8. The method of claim 1, further comprising creating a tunnel for transmitting the identified traffic between the gateway and a traffic detection function (TDF), if the TDF is provided separately from the gateway.

9. The method of claim 8, wherein the tunnel is created during IP session establishment or during application detection.

10. The method of claim 9, wherein if the tunnel is created during IP session establishment, the gateway transmits information about availability of TDF GTP binding to the policy server during the IP session establishment, and creates the tunnel with the TDF upon request of the TDF selected by the policy server.

11. The method of claim 9, wherein if the tunnel is created during application detection, the gateway creates the tunnel with the TDF upon request of the TDF that has detected an application.

12. A gateway apparatus for identifying and controlling traffic in a wireless communication system, the gateway apparatus comprising:

a transceiver configured to:
receive a rule corresponding to a policy and packet filter information including match conditions for a hyper text transfer protocol (HTTP) request and an HTTP response, a RAN scheduling policy index, and scheduling parameters from a policy server in response to receiving an internet protocol (IP) session establishment request from a user equipment (UE), and
transmit a traffic to a radio access network (RAN) to schedule packet; and
a processor configured to:
install an HTTP packet filter based on the packet filter information, and
identify the traffic using the HTTP packet filter in response to receiving an HTTP request from the UE after a transmission control protocol (TCP) session is established between the UE and a content server.

13. The gateway apparatus of claim 12, wherein the processor is configured to:
compare the HTTP request received from the UE with the HTTP packet filter and forward the HTTP request to the content server;
compare an HTTP response received from the content server with the HTTP packet filter; and
if the HTTP request and the HTTP response match with the HTTP packet filter, extract, from the HTTP response, scheduling policy and scheduling parameters for scheduling video packets, and control the transceiver to transmit the extracted scheduling policy and scheduling parameters to the RAN.

14. The gateway apparatus of claim 13, wherein the processor is configured to transmit the extracted scheduling policy and scheduling parameters to the RAN through a general packet radio service (GPRS) tunneling protocol (GTP) extension header.

15. The gateway apparatus of claim 13, wherein the processor is configured to control the transceiver to transmit traffic detection function (TDF) information to the policy server.

16. The gateway apparatus of claim 13, wherein the scheduling parameters include at least one of a scheduling policy index, a bandwidth, a video chunk data size, and a deadline.

17. The gateway apparatus of claim 13, wherein the transceiver receives an HTTP request from the UE after a new TCP session is created between the UE and the content server; and
wherein the processor is configured to:
compare the HTTP request received from the UE with the HTTP packet filter, and control the transceiver to forward the HTTP request to the content server;
compare an HTTP response received from the content server with the HTTP packet filter;
if the HTTP request and the HTTP response match with the HTTP packet filter, determine whether the HTTP request received from the UE is a request for a next chunk of content which is the same as previously requested content;
determine whether the scheduling parameters are the same, if the HTTP request is the request for the next chunk of the content; and
control the transceiver to transmit the extracted scheduling parameters to the RAN, if the scheduling parameters are the same.

18. The gateway apparatus of claim 12, wherein the transceiver is configured to:

receive a session close message from the UE, and forward the received session close message to the content server; and wherein the processor is configured to report scheduling information for closed session to the policy server.

19. The gateway apparatus of claim 12, wherein the processor is configured to create a tunnel for transmitting the identified traffic between the gateway and a traffic detection function (TDF), if the TDF is provided separately from the gateway.

20. The gateway apparatus of claim 19, wherein the tunnel is created during IP session establishment or during application detection.

21. The gateway apparatus of claim 19, wherein if the tunnel is created during IP session establishment, the processor is configured to:

control the transceiver to transmit information about availability of TDF GTP binding to the policy server during the IP session establishment, and create the tunnel with the TDF upon request of the TDF selected by the policy server.

22. The gateway apparatus of claim 20, wherein if the tunnel is created during application detection, the processor is configured to create the tunnel with the TDF upon request of the TDF that has detected an application.

* * * * *